US008600140B2

(12) United States Patent
Jeon et al.

(10) Patent No.: US 8,600,140 B2
(45) Date of Patent: Dec. 3, 2013

(54) IMAGE RECONSTRUCTION APPARATUS AND METHOD FOR RECONSTRUCTING IMAGE OF MICROWAVE TOMOGRAPHY THEREOF

(75) Inventors: Soon-Ik Jeon, Daejeon (KR); Simonov Nikolai, Daejeon (KR); Seong-Ho Son, Daejeon (KR); Hyuk-Je Kim, Daejeon (KR); Jong-Moon Lee, Chungbuk (KR); Jae-Ick Choi, Daejeon (KR); Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 164 days.

(21) Appl. No.: 13/334,094

(22) Filed: Dec. 22, 2011

(65) Prior Publication Data

US 2012/0163727 A1    Jun. 28, 2012

(30) Foreign Application Priority Data

Dec. 23, 2010  (KR) .................. 10-2010-0133992
Jul. 7, 2011    (KR) .................. 10-2011-0067333

(51) Int. Cl.
| | | |
|---|---|---|
| G06K 9/00 | (2006.01) | |
| G06K 9/40 | (2006.01) | |
| G06K 9/36 | (2006.01) | |
| A61B 8/00 | (2006.01) | |
| A61B 8/14 | (2006.01) | |

(52) U.S. Cl.
USPC ........... 382/131; 382/254; 382/276; 600/437; 600/442

(58) Field of Classification Search
USPC ........ 382/128–132, 255, 274, 276; 378/8, 87, 378/62; 600/407, 411, 427, 425, 430
See application file for complete search history.

(56) References Cited

U.S. PATENT DOCUMENTS

| | | | | |
|---|---|---|---|---|
| 5,937,102 | A * | 8/1999 | Jin ................................ | 382/276 |
| 7,684,846 | B2 * | 3/2010 | Johnson et al. ............... | 600/407 |
| 7,841,982 | B2 * | 11/2010 | Johnson et al. ............... | 600/437 |
| 7,852,076 | B2 * | 12/2010 | Hirata et al. .................. | 324/307 |
| 8,366,617 | B2 * | 2/2013 | Johnson et al. ............... | 600/437 |
| 2006/0084859 | A1 * | 4/2006 | Johnson et al. ............... | 600/407 |
| 2006/0241410 | A1 | 10/2006 | Fang et al. | |
| 2006/0255802 | A1 * | 11/2006 | Hirata et al. .................. | 324/318 |
| 2007/0015993 | A1 * | 1/2007 | Ciocan et al. ................. | 600/407 |

OTHER PUBLICATIONS

Tanaka et al, Sinc-Gauss Sampling Formula, http://www.kurims.kyoto-u.ac.jp/~kyodo/kokyuroku/contents/pdf/1573-03.pdfnakaTanaka, 2007.*

(Continued)

*Primary Examiner* — Andrae S Allison
(74) *Attorney, Agent, or Firm* — Rabin & Berdo, P.C.

(57) ABSTRACT

An image reconstruction apparatus includes: a transmission signal generation unit configured to generate a transmission signal in an image reconstruction region, in order to acquire an image reconstruction value; an electromagnetic wave measurement unit configured to measure electromagnetic waves by receiving the transmission signal; an image reconstruction unit configured to update a parameter by using a matrix of matched system of a Sinc-Gauss-shaped basis function which is allocated to each node of a reconstruction mesh in the image reconstruction region, and generate an image reconstruction value; and an optimization determination unit configured to determine whether the parameter of the image reconstruction unit is optimized or not, and output the image reconstruction value or cause the image reconstruction unit to repetitively perform the calculation, wherein the reconstruction mesh has a grid structure of which the size is larger than that of a forward mesh and equal to the image spatial resolution.

18 Claims, 5 Drawing Sheets

(56) References Cited

OTHER PUBLICATIONS

Microwave Tomography: two-Dimensional System for Biological Imaging, Semenov et al; IEEE Transaction on Biomedical Engineering; ISSN: 0018-9294, vol. 43, Issue 9, pp. 869-877, Sep. 1996.*

Tonny Rubaek et al., "Nonlinear Microwave Imaging for Breast-Cancer Screening Using Gauss-Newton's Method and the CGLS Inversion Algorithm", IEEE Transactions on Antennas and Propagation, vol. 55, No. 8, pp. 2320-2331, Aug. 2007.

* cited by examiner

IMAGE RECONSTRUCTION APPARATUS AND METHOD FOR RECONSTRUCTING IMAGE OF MICROWAVE TOMOGRAPHY THEREOF

CROSS-REFERENCES TO RELATED APPLICATIONS

The present application claims priority of Korean Patent Application Nos. 10-2010-0133992 and 10-2011-0067333, filed on Dec. 23, 2010 and Jul. 7, 2011, respectively, which are incorporated herein by reference in their entireties.

BACKGROUND OF THE INVENTION

1. Field of the Invention

Exemplary embodiments of the present invention relate to an image reconstruction system; and, more particularly, to an image reconstruction apparatus for microwave tomography and a method for reconstructing an image of microwave tomography thereof.

2. Description of Related Art

In general, a detector is used to collect the strengths of electromagnetic waves from one cross-section, for example, a transverse section on a space where the electromagnetic waves propagate, through microwave tomography. Then, an image of electrical characteristic distribution of materials existing in the space is reconstructed by calculating the collected data, and displayed through a monitor or the like.

Electromagnetic waves transmitted on a space may be measured, and an image of microwave tomography may be acquired through an image reconstruction process using electric field values of the measured received signals of electromagnetic waves. In order to perform the image reconstruction process, a variety of numerical analysis methods are used. However, such numerical analysis methods are implemented through a complicated algorithm. Therefore, the computation quantities for the image reconstruction process may increase.

SUMMARY OF THE INVENTION

An embodiment of the present invention is directed to an image reconstruction apparatus capable of reducing computation quantities and a method for reconstructing an image of microwave tomography thereof.

Another embodiment of the present invention is directed to an image reconstruction apparatus capable of reducing an image reconstruction time through quick computation and a method for reconstructing an image of microwave tomography thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an image reconstruction apparatus includes: a transmission signal generation unit configured to generate a transmission signal in an image reconstruction region, in order to acquire an image reconstruction value; an electromagnetic wave measurement unit configured to measure electromagnetic waves by receiving the transmission signal; an image reconstruction unit configured to update a parameter by using a matrix of matched system of a Sinc-Gauss-shaped basis function which is allocated to each node of a reconstruction mesh in the image reconstruction region, and generate an image reconstruction value; and an optimization determination unit configured to determine whether the parameter of the image reconstruction unit is optimized or not, and output the image reconstruction value or cause the image reconstruction unit to repetitively perform the calculation. The reconstruction mesh has a grid structure of which the size is larger than that of a forward mesh and equal to the image spatial resolution.

The image reconstruction region may include a region where signals are transmitted, scattered and received through a transmitting antenna and a receiving antenna.

The electromagnetic wave measurement unit may pass electromagnetic waves through the image reconstruction region and acquire a measured value of an electric field of the electromagnetic waves.

The image reconstruction unit may generate the Sinc-Gauss-shaped basis function which is allocated to each node of the reconstruction mesh corresponding to the size of the reconstruction mesh having size of a grid structure larger than that of the forward mesh and equal to the image spatial resolution, generates a matrix of matched system by using the basis function, generates a regularized Jacobian matrix related to the forward mesh by using the matrix of matched system and a Jacobian matrix related to the forward mesh, and updates the parameter of the forward mesh by using the regularized Jacobian matrix related to the forward mesh.

The image reconstruction unit may generate the forward mesh by setting a parameter initial value of the forward mesh which divides the image reconstruction region.

The image reconstruction unit may perform a forward calculation of electromagnetic field numerical analysis, acquires a calculated value of an electric field by calculating the electric field according to the reception of the electromagnetic waves, and calculate an error depending on inconsistency of the measured valued of the electric field and the calculated value of the electric field.

When determining that a difference value between the error and an error at a previous calculation is smaller than a preset allowable difference value or the number of calculations exceeds a preset repetitive calculation number, the optimization determination unit may determine a current state to be an optimized state, and output the image reconstruction value for acquiring a tomography image of the image reconstruction region.

When determining that the current state is not an optimized state, the optimization determination unit may control the image reconstruction unit to generate a regularized Jacobian matrix related to the forward mesh, update the parameter of the forward mesh by using the regularized Jacobian matrix related to the forward mesh, and update the spatial resolution and the grid size of the reconstruction mesh.

In accordance with another embodiment of the present invention, a method for reconstructing an image of in an image reconstruction apparatus includes: measuring an electric field of electromagnetic waves by passing the electromagnetic waves through an image reconstruction region, and acquiring a measured value of the electric field; setting a parameter initial value of a forward mesh; updating a parameter of the forward mesh by using a matrix of matched system of a Sinc-Gauss-shaped basis function which is allocated to each node of a reconstruction mesh having a larger grid structure than that of the forward mesh and equal to the image spatial resolution; determining whether the parameter of the forward mesh is optimized or not; and outputting an image reconstruction value for acquiring a tomography image of the image reconstruction region, when it is determined that the parameter of the forward mesh is optimized.

Said updating the parameter of the forward mesh by using the matrix of matched system of the Sinc-Gauss-shaped basis function which is allocated to each node of the reconstruction mesh having a larger grid structure than that of the forward mesh and equal to the image spatial resolution may include: generating the Sinc-Gauss-shaped basis function which is allocated to each node of the reconstruction mesh having a larger grid structure than that of the forward mesh and equal to the image spatial resolution, and generating the matrix of matched system by using the basis function; performing a forward solution applying numerical analysis of electromagnetic field; acquiring a calculated value of the electric field by calculating the electric field according to the reception of the electromagnetic waves; calculating an error depending on inconsistency of a measured value of the electric field and the calculated value of the electric field; a regularized Jacobian matrix related to the forward mesh by using the matrix of matched system and a Jacobian matrix related to the forward mesh, when it is determined that the parameter of the forward mesh is not optimized; updating the parameter of the forward mesh by using the regularized Jacobian matrix related to the forward mesh; and updating spatial resolution and the grid size of the reconstruction mesh.

In said determining whether the parameter of the forward mesh is optimized or not, when it is determined that a difference value between the error and an error at a previous calculation is smaller than a preset allowable difference value or the number of calculations exceeds a preset repetitive calculation number, it may be determined that the parameter of the forward mesh is optimized.

The basis function may include a Sinc-Gauss-shaped function which is allocated to each node of the reconstruction mesh having a larger size of grid structure than that of the forward mesh and equal to the image spatial resolution.

Said generating the Sinc-Gauss-shaped basis function which is allocated to each node of the reconstruction mesh having a larger size of grid structure than that of the forward mesh and equal to the image spatial resolution, and generating the matrix of matched system by using the basis function may include: generating the matrix of matched system by using an equation: $B=[b_1, b_2, \ldots, b_i, \ldots, b_k]$, where B represents the matrix of matched system of the basis function, $b_i$ represents a Sinc-Gauss-shaped basis function allocated to i-th node of the reconstruction mesh having a size of grid structure larger than that of the forward mesh and equal to the image spatial resolution, and a subscript k represents the number of nodes in the mesh; generating the matrix of matched system by satisfying an equation: $R=[r_1, r_2, \ldots, r_i, \ldots, r_n]=B \cdot B^T$, where R represents a spatial resolution matrix, $r_i$ represents a point source function, B represents the matrix of matched system of the basis function, $B^T$ represents a transpose matrix of the matrix of matched system of the basis function, and a subscript n represents the number of nodes in the forward mesh; and generating the matrix of matched system by satisfying the following two conditions at the same time: (condition 1) effective width of the basis functions that relates to the spatial resolution is equal to the size of the reconstruction mesh, and (condition 2) all point source functions $r_i$ have the same shape and the same peak value.

Said generating the regularized Jacobian matrix related to the forward mesh by using the matrix of matched system and the Jacobian matrix related to the forward mesh may include calculating the regularized Jacobian matrix related to the forward mesh by using an equation: $J_{reg}=J_N \cdot B$, where $J_{reg}$ represents the regularized Jacobian matrix, $J_N$ represents the Jacobian matrix, and B represents the matrix of matched system of the basis function.

Said updating the parameter of the forward mesh by using the matrix of matched system of a Sinc-Gauss-shaped basis function which is allocated to each node of the reconstruction mesh having a larger grid structure than that of the forward mesh and equal to the image spatial resolution may include updating the parameter of the forward mesh by using an equation: $\Delta k^2 = B \cdot (J_{reg}^H \cdot J_{reg})^{-1} \cdot J_{reg}^H \cdot \Delta s$, where $\Delta k^2$ represents a change in the parameter at the forward mesh, B represents the matrix of matched system of the basis function, $J_{reg}$ represents the regularized Jacobian matrix related to the forward mesh, a superscript H represents a conjugate transpose matrix, a superscript $-1$ represents an inverse matrix, and $\Delta s$ represents an inconsistency error between the measured value of the electric field and the calculated value of the electric field.

In accordance with another embodiment of the present invention, a method for reconstructing an image in an image reconstruction apparatus includes: measuring an electric field of electromagnetic waves by passing the electromagnetic waves through an image reconstruction region, and acquiring a measured value of the electric field; setting a parameter initial value of a forward mesh which divides the image reconstruction region; updating a Sinc-Gauss-shaped basis function which is allocated to each node of a reconstruction mesh having a larger grid structure than that of the forward mesh and equal to the image spatial resolution, and generating a matrix of matched system by using the basis function; performing a forward solution applying numerical analysis of electromagnetic field; acquiring a calculated value of the electric field by calculating the electric field according to the reception of the electromagnetic waves; calculating an error depending on inconsistency of the measured value of the electric field and the calculated value of the electric field; when it is determined that a difference value between the error and an error at a previous calculation is smaller than a preset allowable difference value or the number of calculations exceeds a preset repetitive calculation number, determining a current state to be an optimized state; and outputting an image reconstruction value for acquiring a tomography image of the image reconstruction region, when it is determined that the current state is an optimized state.

The image reconstruction region may include a region where signals are transmitted and received through a transmitting antenna and a receiving antenna.

The method may further include, when it is determined that the current state is not an optimized state: generating a regularized Jacobian matrix related to the forward mesh by using the matrix of matched system and a Jacobian matrix related to the forward mesh; and adjusting an initial value of the parameters by updating reconstructed parameters at the forward mesh.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The exemplary embodiments of the present invention provide an apparatus and method for reconstructing an image of microwave tomography.

Figure 1:
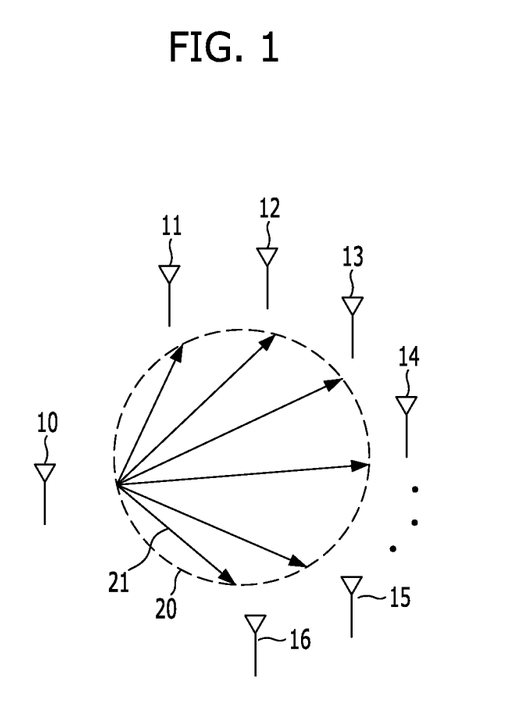
FIG. 1 is a diagram illustrating an image reconstruction region for microwave tomography in accordance with an embodiment of the present invention.

FIG. 1 is a diagram illustrating an image reconstruction region for microwave tomography in accordance with an embodiment of the present invention.

Referring to FIG. 1, a transmitting antenna 10 and a plurality of receiving antennas 11 to 16 for receiving signals transmitted from the transmitting antenna 10 are positioned around an image reconstruction region 20.

The image reconstruction apparatus in accordance with the embodiment of the present invention performs microwave tomography on the image reconstruction region 20. For this operation, the image reconstruction apparatus transmits electromagnetic waves to the image reconstruction region 20 through the transmitting antenna.

The transmitted electromagnetic waves including an electromagnetic wave 21, for example, are received by the plurality of receiving antennas 11 to 16.

The image reconstruction apparatus may receive the transmitted electromagnetic waves and reconstruct an image through the microwave tomography.

Figure 2:
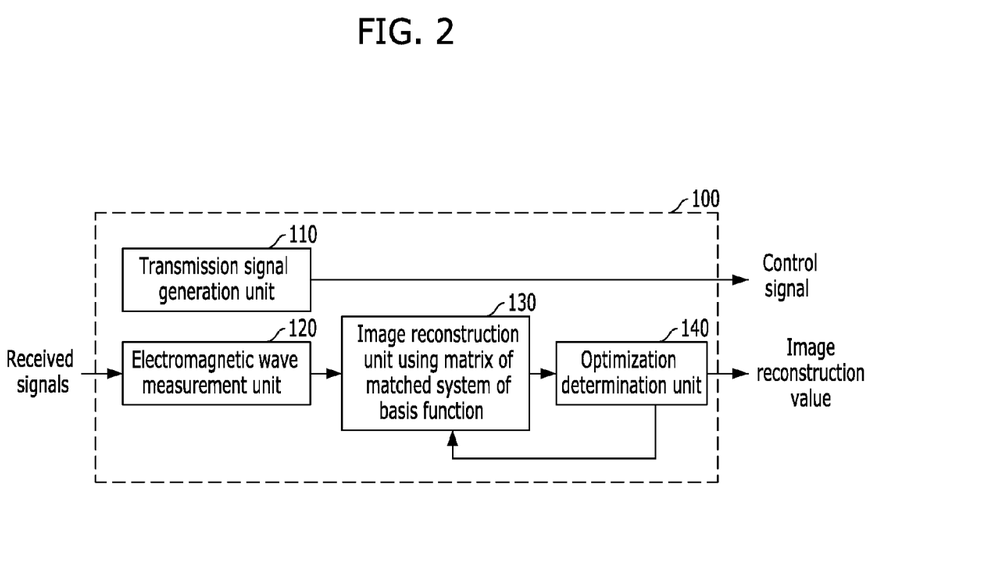
FIG. 2 is a diagram illustrating an image reconstruction apparatus using microwave tomography in accordance with the embodiment of the present invention.

FIG. 2 is a diagram illustrating the image reconstruction apparatus using microwave tomography in accordance with the embodiment of the present invention.

Referring to FIG. 2, the image reconstruction apparatus 100 includes a transmission signal generation unit 110, an electromagnetic wave measurement unit 120, an image reconstruction unit 130 using a matrix of matched system of a basis function, and an optimization determination unit 140. In the following descriptions of FIG. 2, the image reconstruction unit 130 using a matrix of matched system of a basis function will be referred to as first image reconstruction unit.

The transmission signal generation unit 110 is configured to generate a signal and transmit electromagnetic waves of the generated signal through the transmitting antenna or the like.

The electromagnetic wave measurement unit 120 is configured to measure signals received through one or more receiving antennas for receiving signals. Here, the image reconstruction region 20 is formed between the transmitting antenna and the receiving antennas.

The first image reconstruction unit 130 is configured to generate an image reconstruction value by using a matrix of matched system of a Sinc-Gauss-shaped basis functions which are allocated to a reconstruction mesh in the image reconstruction region such a way that the peak value of each basis function is located in certain node of the reconstruction mesh. The reconstruction mesh has a grid structure having a larger size than that of a forward mesh and equal to the image spatial resolution. The forward mesh is obtained by dividing the image reconstruction region 20 into a rectangular-grid-shape mesh, for example. When the forward mesh is used, the forward solution applying numerical analysis of electromagnetic field may be performed at the positions of the receiving antennas 11 to 16. When the reconstruction mesh is used, the optimization calculation in the image reconstruction region may be achieved.

The optimization determination unit 140 is configured to determine whether or not a change in error depending on inconsistency of a measured values of the electric field in received signals with a calculated value of the electric field in received signals is minimized by updating parameter. When the change of error is minimized, the optimization determination unit 140 outputs an image reconstruction value. However, when the change of error is not minimized, the optimization determination unit 140 may request the first image reconstruction unit 130 to adjust the parameter. The optimization determination unit 140 regenerates an optimized image reconstruction value by adjusting the parameter and controlling the mesh size through the first image reconstruction unit 130. For example, the optimization determination unit 140 regenerates an image reconstruction values at which the change of error depending on the inconsistency of the measured value of the electric field with the calculated value of the electric field is minimized.

The image reconstruction apparatus 100 may further include an image reconstruction output unit configured to receive the image reconstruction value and output a tomography image of the image reconstruction region by using the received image reconstruction value. The image reconstruction output unit may include a display device for outputting an image.

The first image reconstruction unit 130 generates the image reconstruction value based on the parameter and the mesh of which the size is set, in order for image reconstruction, and uses a matrix of matched system of a Sinc-Gauss-shaped basis function.

The image reconstruction apparatus 100 may reduce the computation quantities occurring between the forward mesh and the reconstruction mesh, by using the reconstruction mesh having a size of grid structure larger than that of the forward mesh and equal to the image spatial resolution. Furthermore, the image reconstruction apparatus 100 may reduce the computation quantities required for updating the parameter by using the matrix of matched system of the Sinc-Gauss-shaped basis function.

Figure 3:
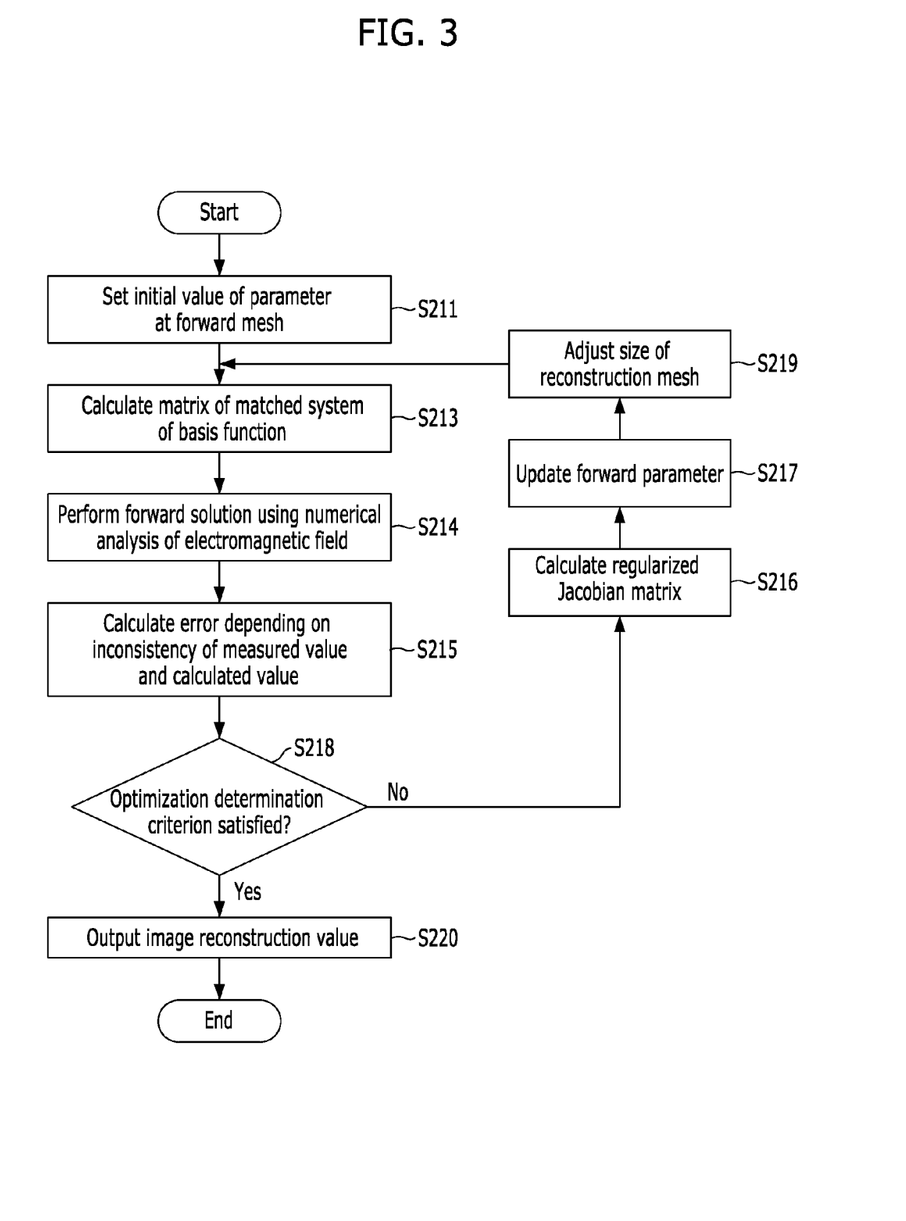
FIG. 3 is a flow chart showing an image reconstruction operation of microwave tomography in the image reconstruction apparatus in accordance with the embodiment of the present invention.

FIG. 3 is a flow chart showing the image reconstruction operation of microwave tomography in the image reconstruction apparatus in accordance with the embodiment of the present invention.

At this time, the first image reconstruction unit 130 uses an electric field in received signals measurement value of the electromagnetic wave measurement unit 120 which receives electromagnetic waves passing through the image reconstruction region 20 and measures and acquires the electric field of the electromagnetic waves.

Referring to FIG. 3, the first image reconstruction unit 130 sets a parameter initial value of the forward mesh which divides the image reconstruction region at step S211.

At step S213, the first image reconstruction unit 130 generates a Sinc-Gauss-shaped basis function which is allocated to each node of the reconstruction mesh corresponding to the size of the reconstruction mesh. Here, an effective width of the function indicates spatial resolution and equal to the size of the reconstruction mesh.

At step S213, the first image reconstruction unit 130 generates a matrix of matched system of the basis function by using the Sinc-Gauss-shaped basis function. The matrix of matched system of the basis function may be expressed as Equation 1 below.

$$B=[b_1, b_2, \ldots, b_i, \ldots, b_k] \qquad \text{Eq. 1}$$

Here, B represents the matrix of matched system of the basis function, $b_i$ represents a Sinc-Gauss-shaped basis function allocated to i-th node of the reconstruction mesh having a grid size larger than that of the forward mesh and equal to the image spatial resolution, and a subscript k represents the number of nodes in the reconstruction mesh.

The matrix of matched system needs to satisfy Equation 2 below.

$$R=[r_1, r_2, \ldots, r_i, \ldots, r_n]=B \cdot B^T \qquad \text{Eq. 2}$$

Here, R represents a spatial resolution matrix, $r_i$ represents a point source function, B represents the matrix of matched system of the basis function, $B^T$ represents a transpose matrix of the matrix of matched system of the basis function, and a subscript n represents the number of nodes in the forward mesh.

The matrix of matched system needs to satisfy the following two conditions at the same time.

(Condition 1) Effective width of the basis functions that relates to the spatial resolution is equal to the size of the reconstruction mesh.

(Condition 2) All point source functions $r_i$ have the same shape and the same peak value.

At step S214, the first image reconstruction unit 130 performs a forward solution applying numerical analysis of electromagnetic field. Furthermore, the first image reconstruction unit 130 acquires a calculated value of the electric field and the received signals of the transmitted and scattered electromagnetic waves.

At step S215, the first image reconstruction unit 130 calculates an error depending on the inconsistency of the measured value of the electric field with the calculated value of the electric field.

At step S218, the optimization determination unit 140 determines whether or not a change of the error depending on the inconsistency of the measured value of the electric field with the calculated value of the electric field satisfies an optimization determination criterion. That is, when it is determined that a difference value between a current error and an error at a previous calculation is smaller than a preset allowable difference value, the first image reconstruction unit 130 determines a current state to be an optimized state. Furthermore, when it is determined that the number of calculations exceeds a preset repetitive calculation number, the optimization unit 140 determines the current state to be an optimized state.

When it is determined at the step S218 that the change of the error depending on the inconsistency of the measured value of the electric field with the calculated value of the electric field does not satisfy the optimization determination criterion, the optimization determination unit 140 proceeds to steps S216 and S217, in order to request a calculation for the parameter update using Gauss-Newton (GN) parameters update algorithm [1] with a regularized Jacobian matrix. Furthermore, the optimization determination unit 140 proceeds to step S219, in order to request parameter setting for adjusting the size of the mesh.

At the step S216, the first image reconstruction unit 130 calculates a regularized Jacobian matrix by using the matrix of matched system of the basis function. When a Jacobian matrix related to the forward mesh is represented by $J_R$, the regularized Jacobian matrix may be expressed as Equation 3 below.

$$J_{reg}=J_N \cdot B \qquad \text{Eq. 3}$$

Here, $J_{reg}$ represents the regularized Jacobian matrix, $J_N$ represents the Jacobian matrix related to the forward mesh, and B represents the matrix of matched system of the basis function.

At step S217, the first image reconstruction unit 130 updates the parameter of the forward mesh by using the regularized Jacobian matrix. The update of the parameter at the forward mesh may be expressed as Equation 4 below.

$$\Delta k^2 = B \cdot (J_{reg}^H \cdot J_{reg})^{-1} \cdot J_{reg}^H \cdot \Delta s \qquad \text{Eq. 4}$$

Here, $\Delta k^2$ represents a change of the parameter at the forward mesh, B represents the matrix of matched system of the basis function, $J_{reg}$ represents the regularized Jacobian matrix, a superscript H represents a conjugate transpose matrix, a superscript −1 represents an inverse matrix, and $\Delta s$ represents an inconsistency difference between the measured value of the electric field and the calculated value of the electric field.

At step S219, the first image reconstruction unit 130 adjusts the size of the reconstruction mesh, and proceeds to step S213.

When it is determined at the step S218 that the change of the error depending on the inconsistency of the measured value of the electric field with the calculated value of the electric field satisfies the optimization determination criterion, the optimization determination unit 140 proceeds to step S220.

At the step S220, the optimization determination unit 140 outputs the image reconstruction value and ends the operation.

Figure 4:
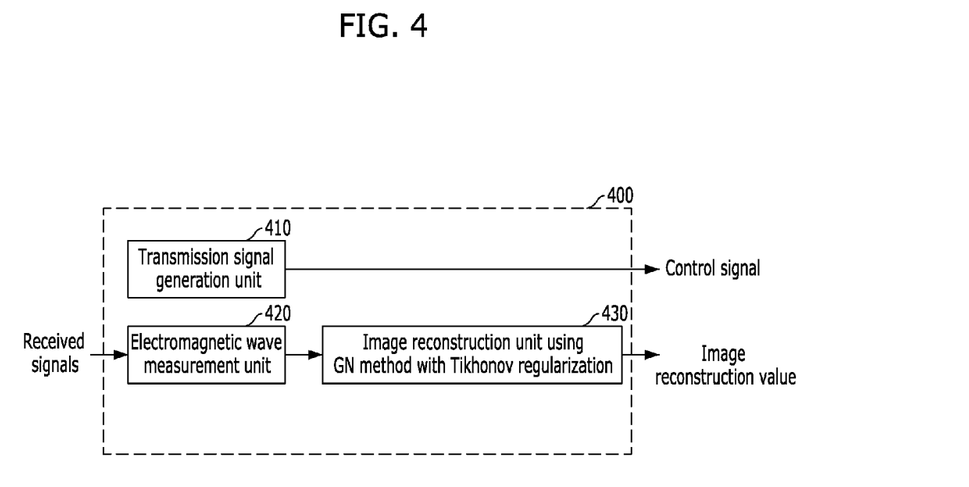
FIG. 4 is a diagram illustrating another image reconstruction apparatus using microwave tomography for comparison with the image reconstruction apparatus in accordance with the embodiment of the present invention.

FIG. 4 is a diagram illustrating another image reconstruction apparatus using microwave tomography for comparison with the image reconstruction apparatus in accordance with the embodiment of the present invention.

Referring to FIG. 4, the image reconstruction apparatus 400 includes a transmission signal generation unit 410, an electromagnetic wave measurement unit 420, and an image reconstruction unit 430 using GN parameters update algorithm [1] with Tikhonov regularization [2]. In the following descriptions of FIG. 4, the image reconstruction unit 430 using Tikhonov regularization will be referred to as second image reconstruction unit, for convenience of explanation.

The transmission signal generation unit 410 is configured to generate a signal and transmit electromagnetic waves of the generated signal through a transmitting antenna or the like.

The electromagnetic wave measurement unit 420 is configured to measure signals received by one or more receiving antennas for receiving signals. Here, an image reconstruction region 20 (FIG. 1) is located between the transmitting antenna and the receiving antennas.

The second image reconstruction unit 430 is configured to calculate an electric field value by using a forward solution applying numerical analysis of electromagnetic field through a forward mesh, and generate an image reconstruction value using GN algorithm with the Tikhonov regularization. In this case, the total number of the reconstruction mesh nodes in the image reconstruction region is considerably larger in comparison with the case of the image reconstruction apparatus of the present invention.

Figure 5:
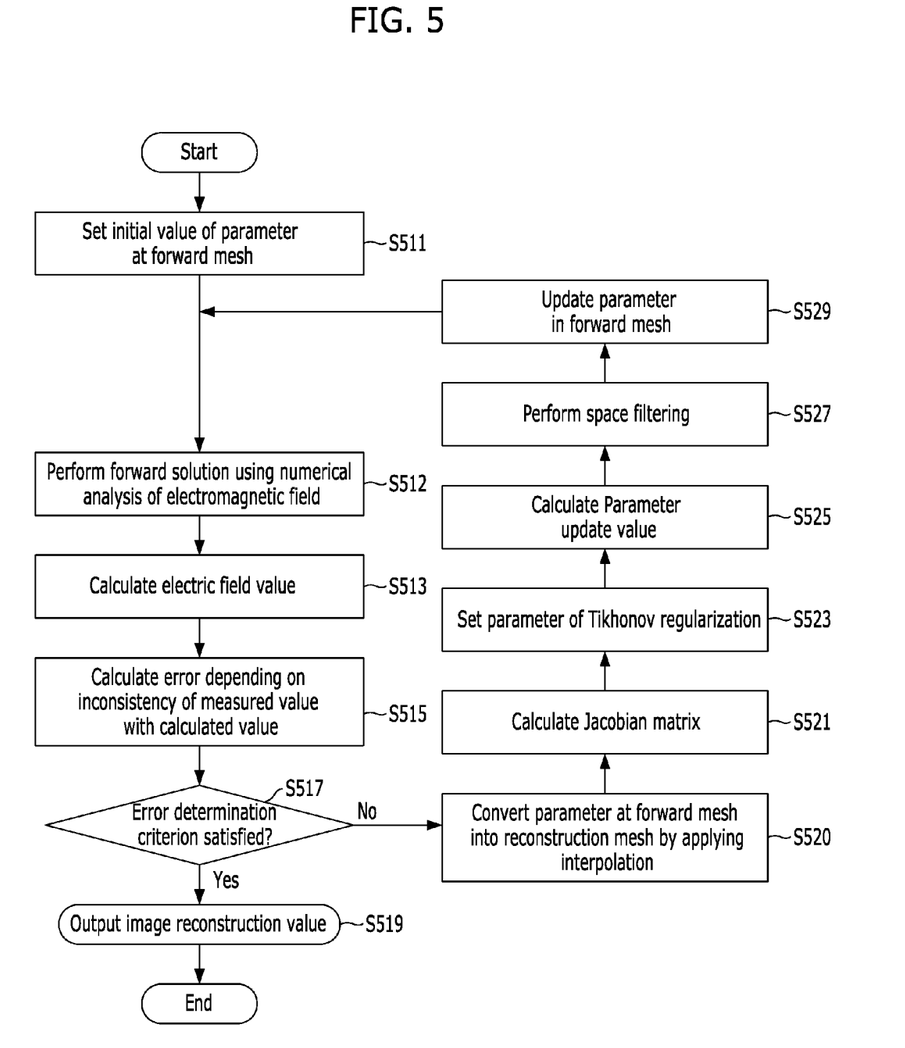
FIG. 5 is a flow chart showing an image reconstruction operation of microwave tomography in the image reconstruction apparatus of FIG. 4.

FIG. 5 is a flow chart showing the image reconstruction operation of microwave tomography in the image reconstruction apparatus of FIG. 4.

Referring to FIG. 5, the second image reconstruction unit 430 sets a parameter initial value of the forward mesh which divides the image reconstruction region, at step S511.

At step S512, the second image reconstruction unit 430 performs a forward solution applying numerical analysis of electromagnetic field.

At step S513, the second image reconstruction unit 430 acquires a calculated value of an electric field and the received signals of the transmitted and scattered of electromagnetic waves.

At step S515, the second image reconstruction unit 430 calculates an error depending on inconsistency of the measured value of the electric field with the calculated value of the electric field.

At step S517, the second image reconstruction unit 430 checks whether the error satisfies an error determination criterion or not.

When it is checked at the step S517 that the error did not satisfy the error determination criterion, that is, a large error occurred, the second image reconstruction unit 430 proceeds to step S520.

At the step S520, the second image reconstruction unit 430 maps the forward mesh into a reconstruction mesh having a different grid shape and a different grid number. At this time, the second image reconstruction unit 430 performs the conversion by applying interpolation, in order to compensate for a difference value depending on the different grid positions of forward mesh nodes and the reconstruction mesh nodes.

At step S521, the second image reconstruction unit 430 calculates a Jacobian matrix related to the reconstruction mesh.

At step S523, the second image reconstruction unit 430 sets a parameter of Tikhonov regularization.

At step S523, the second image reconstruction unit 430 calculates updating of parameters values solving an inverse matrix equation by GN algorithm with the Tikhonov regularization.

At step S527, the second image reconstruction unit 430 makes cleaning of extra noises in the update values through space filtering.

At step S529, the second image reconstruction unit 430 updates the reconstructed parameters at the forward mesh. At this time, the image reconstruction unit 430 converts parameters updated at the reconstruction mesh into the forward mesh by applying interpolation in order to compensate for a difference value of the different positions of the reconstruction mesh nodes and the forward mesh nodes. Then unit 430 proceeds to the step S512.

When it is determined at the step S517 that the updated parameter satisfies the error determination criterion, the second image reconstruction unit 430 proceeds to step S519.

At the step S519, the second image reconstruction unit 430 outputs the image reconstruction value and ends the operation.

The image reconstruction apparatus 400 described with reference to FIG. 5 or 6 uses GN algorithm with the Tikhonov regularization. In this case, the total number of the reconstruction mesh nodes in the image reconstruction region is considerably larger in comparison with the case of the image reconstruction apparatus of the present invention. Therefore, the image reconstruction apparatus 400 has a larger number of parameters allocated in the mesh than the image reconstruction apparatus 100 described with reference to FIG. 2 or 3. As the number of parameters increases, the computation quantities inevitably increase.

The image reconstruction apparatus 100 in accordance with the embodiment of the present invention does not require the parameters of the Tikhonov regularization. However, since the image reconstruction apparatus 400 uses lager number of the reconstruction mesh nodes with the algorithm of the Tikhonov regularization, the image reconstruction apparatus 400 has larger computation quantities than the image reconstruction apparatus 100 using smaller number of the reconstruction mesh nodes and the matrix of matched system of the basis function with the spatial resolution equal to the reconstructing mesh size.

Furthermore, the image reconstruction apparatus 400 has larger computation quantities than the image reconstruction apparatus 100 due to the mapping operation according to the matching between the meshes, the interpolation operation according to the matching between the meshes, and the requirement of the space filter.

That is, the image reconstruction apparatus 100 in accordance with the embodiment of the present invention may perform a stabilized image reconstruction operation of which the computation quantities are reduced.

In accordance with the exemplary embodiments of the present invention, the image reconstruction apparatus may reduce the computation quantities by using the matrix of matched system of the Sinc-Gauss-shaped basis function which is allocated to each node of the reconstruction mesh, in order to reconstruct an image of microwave tomography. Furthermore, the image reconstruction apparatus may reduce an image reconstruction time through a quick computation by the reduction of the computation quantities.

While the present invention has been described with respect to the specific embodiments, it will be apparent to those skilled in the art that various changes and modifications may be made without departing from the spirit and scope of the invention as defined in the following claims.

What is claimed is:

1. An image reconstruction apparatus comprising:
    a transmission signal generation unit configured to generate a transmission signal in an image reconstruction region, in order to acquire an image reconstruction value;
    an electromagnetic wave measurement unit configured to measure electromagnetic waves by receiving the transmission signal;
    an image reconstruction unit configured to update a parameter by using a matrix of matched system of a Sinc-Gauss-shaped basis function which is allocated to each node of a reconstruction mesh in the image reconstruction region, and generate an image reconstruction value; and
    an optimization determination unit configured to determine whether the parameter of the image reconstruction unit is optimized or not, and output the image reconstruction value or cause the image reconstruction unit to repetitively perform the calculation,
    wherein the reconstruction mesh has a grid structure of which the size is larger than that of a forward mesh and equal to the image spatial resolution.

2. The image reconstruction apparatus of claim 1, wherein the image reconstruction region comprises a region where signals are transmitted, scattered and received through a transmitting antenna and a receiving antenna.

3. The image reconstruction apparatus of claim 1, wherein the electromagnetic wave measurement unit passes electromagnetic waves through the image reconstruction region and acquires a measured value of an electric field of the electromagnetic waves.

4. The image reconstruction apparatus of claim 1, wherein the image reconstruction unit generates the Sinc-Gauss-shaped basis function which is allocated to each node of the reconstruction mesh corresponding to the size of the reconstruction mesh having size of a grid structure larger than that of the forward mesh and equal to the image spatial resolution, generates a matrix of matched system by using the basis function, generates a regularized Jacobian matrix related to the forward mesh by using the matrix of matched system and a Jacobian matrix related to the forward mesh, and updates the parameter of the forward mesh by using the regularized Jacobian matrix related to the forward mesh.

5. The image reconstruction apparatus of claim 4, wherein the image reconstruction unit generates the forward mesh by setting a parameter initial value of the forward mesh which divides the image reconstruction region.

6. The image reconstruction apparatus of claim 4, wherein the image reconstruction unit performs a forward calculation of electromagnetic field numerical analysis, acquires a calculated value of an electric field by calculating the electric field according to the reception of the electromagnetic waves, and calculates an error depending on inconsistency of the measured valued of the electric field and the calculated value of the electric field.

7. The image reconstruction apparatus of claim 6, wherein, when determining that a difference value between the error and an error at a previous calculation is smaller than a preset allowable difference value or the number of calculations exceeds a preset repetitive calculation number, the optimization determination unit determines a current state to be an optimized state, and outputs the image reconstruction value for acquiring a tomography image of the image reconstruction region.

8. The image reconstruction apparatus of claim 7, wherein, when determining that the current state is not an optimized state, the optimization determination unit controls the image reconstruction unit to generate a regularized Jacobian matrix related to the forward mesh, update the parameter of the forward mesh by using the regularized Jacobian matrix related to the forward mesh, and update the spatial resolution and the grid size of the reconstruction mesh.

9. A method for reconstructing an image in an image reconstruction apparatus, comprising:
  measuring an electric field of electromagnetic waves by passing the electromagnetic waves through an image reconstruction region, and acquiring a measured value of the electric field;
  setting a parameter initial value of a forward mesh;
  updating a parameter of the forward mesh by using a matrix of matched system of a Sinc-Gauss-shaped basis function which is allocated to each node of a reconstruction mesh having a larger grid structure than that of the forward mesh and equal to the image spatial resolution;
  determining whether the parameter of the forward mesh is optimized or not; and
  outputting an image reconstruction value for acquiring a tomography image of the image reconstruction region, when it is determined that the parameter of the forward mesh is optimized.

10. The method of claim 9, wherein said updating the parameter of the forward mesh by using the matrix of matched system of the Sinc-Gauss-shaped basis function which is allocated to each node of the reconstruction mesh having a larger grid structure than that of the forward mesh and equal to the image spatial resolution comprises:
  generating the Sinc-Gauss-shaped basis function which is allocated to each node of the reconstruction mesh having a larger grid structure than that of the forward mesh and equal to the image spatial resolution, and generating the matrix of matched system by using the basis function;
  performing a forward solution applying numerical analysis of electromagnetic field;
  acquiring a calculated value of the electric field by calculating the electric field according to the reception of the electromagnetic waves;
  calculating an error depending on inconsistency of a measured value of the electric field and the calculated value of the electric field;
  generating a regularized Jacobian matrix related to the forward mesh by using the matrix of matched system and a Jacobian matrix related to the forward mesh, when it is determined that the parameter of the forward mesh is not optimized;
  updating the parameter of the forward mesh by using the regularized Jacobian matrix related to the forward mesh; and
  updating spatial resolution and the grid size of the reconstruction mesh.

11. The method of claim 10, wherein, in said determining whether the parameter at the forward mesh is optimized or not,
  wherein when it is determined that a difference value between the error and an error at a previous calculation is smaller than a preset allowable difference value or the number of calculations exceeds a preset repetitive calculation number, it is determined that the parameter at the forward mesh is optimized.

12. The method of claim 10, wherein the basis function comprises a Sinc-Gauss-shaped function which is allocated to each node of the reconstruction mesh having a larger size of grid structure than that of the forward mesh and equal to the image spatial resolution.

13. The method of claim 10, wherein said generating the Sinc-Gauss-shaped basis function which is allocated to each node of the reconstruction mesh having a larger size of grid structure than that of the forward mesh and equal to the image spatial resolution, and generating the matrix of matched system by using the basis function comprises:
  generating the matrix of matched system by using Equation 5 below:

$$B=[b_1,b_2,\ldots,b_i,\ldots,b_k] \qquad \text{Eq. 5}$$

where B represents the matrix of matched system of the basis function, $b_i$ represents a Sinc-Gauss-shaped basis function allocated to i-th node of the reconstruction mesh having a size of grid structure larger than that of the forward mesh and equal to the image spatial resolution, and a subscript k represents the number of nodes in the mesh;
  generating the matrix of matched system by satisfying Equation 6 below:

$$R=[r_1,r_2,\ldots,r_i,\ldots,r_n]=B \cdot B^T \qquad \text{Eq. 6}$$

where R represents a spatial resolution matrix, $r_i$ represents a point source function, B represents the matrix of matched system of the basis function, $B^T$ represents a transpose matrix of the matrix of matched system of the basis function, and a subscript n represents the number of nodes in the forward mesh; and generating the matrix of matched system by satisfying the following two conditions at the same time:
(condition 1) effective width of the basis functions that relates to the spatial resolution is equal to the size of the parameter mesh, and
(condition 2) all point source functions $r_i$ have the same shape and the same peak value.

14. The method of claim 10, wherein said generating the regularized Jacobian matrix related to the forward mesh by using the matrix of matched system and the Jacobian matrix related to the forward mesh comprises calculating the regularized Jacobian matrix related to the forward mesh by using Equation 7 below:

$$J_{reg} = J_N \cdot B \qquad \text{Eq. 7}$$

where $J_{reg}$ represents the regularized Jacobian matrix related to the forward mesh, $J_N$ represents the Jacobian matrix, and B represents the matrix of matched system of the basis function.

15. The method of claim 10, wherein said updating the parameter of the forward mesh by using the matrix of matched system of a Sinc-Gauss-shaped basis function which is allocated to each node of the reconstruction mesh having a larger grid structure than that of the forward mesh and equal to the image spatial resolution comprises updating the parameter of the forward mesh by using Equation 8 below:

$$\Delta k^2 = B \cdot (J_{reg}^H \cdot J_{reg})^{-1} \cdot J_{reg}^H \cdot \Delta s \qquad \text{Eq. 8}$$

where $\Delta k^2$ represents a change in the parameter at the forward mesh, B represents the matrix of matched system of the basis function, $J_{reg}$ represents the regularized Jacobian matrix related to the forward mesh, a superscript H represents a conjugate transpose matrix, a superscript −1 represents an inverse matrix, and $\Delta s$ represents an inconsistency error between the measured value of the electric field and the calculated value of the electric field.

16. A method for reconstructing an image in an image reconstruction apparatus, comprising:
measuring an electric field of electromagnetic waves by passing the electromagnetic waves through an image reconstruction region, and acquiring a measured value of the electric field;
setting a parameter initial value of a forward mesh which divides the image reconstruction region;
updating a Sinc-Gauss-shaped basis function which is allocated to each node of a reconstruction mesh having a larger grid structure than that of the forward mesh and equal to the image spatial resolution, and generating a matrix of matched system by using the basis function;
performing a forward solution applying numerical analysis of electromagnetic field;
acquiring a calculated value of the electric field by calculating the electric field according to the reception of the electromagnetic waves;
calculating an error depending on inconsistency of the measured value of the electric field and the calculated value of the electric field;
when it is determined that a difference value between the error and an error at a previous calculation is smaller than a preset allowable difference value or the number of calculations exceeds a preset repetitive calculation number, determining a current state to be an optimized state; and
outputting an image reconstruction value for acquiring a tomography image of the image reconstruction region, when it is determined that the current state is an optimized state.

17. The method of claim 16, wherein the image reconstruction region comprises a region where signals are transmitted and received through a transmitting antenna and a receiving antenna.

18. The method of claim 16, further comprising, when it is determined that the current state is not an optimized state:
generating a regularized Jacobian matrix related to the forward mesh by using the matrix of matched system and a Jacobian matrix related to the forward mesh; and
adjusting an initial value of the parameters by updating reconstructed parameters at the forward mesh.

* * * * *